United States Patent [19]

Meyer

[11] 3,972,710

[45] Aug. 3, 1976

[54] METHOD OF UPGRADING TANTALUM AND NIOBIUM CONCENTRATION IN SLAGS

[75] Inventor: Horst Meyer, Karsten-Balder-Stieg, Germany

[73] Assignee: Hermann C. Starchk Berlin, Berlin, Germany

[22] Filed: July 9, 1975

[21] Appl. No.: 594,202

[30] Foreign Application Priority Data
July 23, 1974 Germany............................ 2435427

[52] U.S. Cl............................ 75/101 R; 75/101 BE;
75/121; 423/68
[51] Int. Cl.²........................................ C22B 34/24
[58] Field of Search..................... 75/101 R, 121, 24; 423/68

[56] References Cited
UNITED STATES PATENTS

| | | | |
|---|---|---|---|
| 2,972,530 | 2/1961 | Zimmerley et al........................ | 75/1 |
| 3,300,297 | 1/1967 | Fields...................................... | 75/24 |
| 3,447,894 | 6/1969 | Gustison et al....................... | 75/24 X |
| 3,585,024 | 6/1971 | Cenerazzo et al.................. | 75/97 X |

*Primary Examiner*—G. Ozaki
*Attorney, Agent, or Firm*—Hammond & Littell

[57] ABSTRACT

In a method for upgrading the concentration of tantalum and niobium in slags and residues by treating the slags or residues or ore with hydrofluoric acid or a mixture of hydrofluoric acid and sulfuric acid to dissolve the tantalum and niobium and extracting the tantalum and niobium from the resulting solution with a ketone to obtain the said elements and a spent acid, the improvement comprising first treating the slags, residue or ore with spent acid containing hydrofluoric acid and/or silicofluoric acid before the dissolution step.

4 Claims, No Drawings

METHOD OF UPGRADING TANTALUM AND NIOBIUM CONCENTRATION IN SLAGS

STATE OF THE ART

U.S. Pats. No. 3,585,024 and No. 2,972,530 describe methods of upgrading ores or slags containing low grades of tantalum and niobium by smelting which requires a number of steps in order to obtain a material suitable for the liquidliquid extraction of tantalum and niobium. It is also known that ores can be upgraded chemically by wet treatments such as basic decomposition under pressure followed by further processing as normal in silicate-containing niobium and tantalum slags (British Pat. No. 1,020,453). It is further known that the low grade ores can be treated directly with hydrofluoric acid to obtain products suitable for further processing.

All the said methods are expensive and cumbersome but it is known that high grade niobium-tantalum ores can only satisfy a portion of the commercial demand for these metals and their compounds so the upgrading of low grade ores is of great commercial importance.

OBJECTS OF THE INVENTION

It is an object of the invention to provide a novel economical process for the upgrading of low grade tantalumniobium ores.

It is a further object of the invention to provide an improved process for recovering tantalum and niobium from low grade materials by a preliminary treatment with spent acids containing hydrofluoric acid and/or silicofluoric acid.

These and other objects and advantages of the invention will become obvious from the following detailed description.

THE INVENTION

The improvement of the invention in the method of upgrading the concentration of tantalum and niobium in slags and residues comprising treating the slags or residues or ores with hydrofluoric acid alone or admixed with sulfuric acid to dissolve the tantalum and niobium and extracting the niobium and tantalum from the resulting solution with a methyl isobutyl ketone to obtain the said elements in the methyl isobutyl ketone and a spent fluoride containing acid solution is based on the step of first treating the slag, residue or ore with the spent hydrofluoric acid or silicofluoric acid to convert metal impurities to insoluble fluorides without substantially dissolving the tantalum or niobium before the dissolution step.

It has been surprisingly found that the fluoride containing spent acid with a high sulfuric acid content obtained from the extraction steps with a ketone is useful for the hydration of slags and other highly annealed residues and make them more readily soluble for the dissolution step. The ratio of the spent acid to the slag in this hydration step is to be determined empirically to avoid an excess of the spent acid which would cause the undesired dissolution of tantalum and niobium to a large extent.

The resulting hydrated slag or residue or ore requires much less hydrofluoric acid to dissolve the valuable tantalum and niobium than expected because the treatment with the spent acid containing fluoride converts the inorganic undesired impurities in the preliminary treatment to compounds which are not soluble in the hydrofluoric acid containing extracting solution. In the prior art processes, these undesired metallic containing compounds were dissolved and consumed extra acid. Therefore, the process of the invention with the pretreatment step consumes much less hydrofluoric acid in the dissolution of the tantalum and niobium so that the thus treated slags are equivalent to a high grade tantalite-columbite ore.

The ratio of the spent acid to the slag to be treated is adjusted so that at least 95% of the tantalum and niobium remain in the slag. This spent acid ratio is determined empirically since the amount of free hydrofluoric acid and sulfuric acid as well as the amount of fluorides and sulfates of elements such as iron, silicon, titanium, manganese, aluminum, chromium, tungsten, etc. in the spent acid is subject to large variations. Therefore, this quick determination is of great importance to the operation. In order to determine the required spent acid/slag ratio samples of 100 g each of tantalum containing slag are treated with 50, 100, 150, etc. ml respectively of the spent acid at temperatures of about 100°C. After 10 minutes of such a treatment, whereby the mixtures have been well stirred, one sample each is taken from every solution and its tantalum content determined with X-ray fluorescence. According to the invention such a spent acid/slag ratio is selected, which in the above mentioned test proved to show a dissolution leading to a concentration of not more than 0.1 g $Ta_2O_5$ per liter.

Another modification of the invention resides in using in place of the spent acid a silicofluoric acid such as the spent acid solutions produced in the production of phosphate containing fertilizers. In contrast to the spent hydrofluoric acid, the silicofluoric acid solution may be used even in great excess since the tantalum and niobium are not soluble to any large extent in the silicofluoric acid. However, the empirical determination of the amount of silicofluoric acid solution to be used is preferred to avoid an acid effluent which would then require further neutralization treatment before waste disposal.

The method of the invention has the advantage of converting the soluble impurities in the slag or ore or residue to the fluoride forms which are not soluble in the hydrofluoric acid used in the extraction step. This results in a considerable saving in the amount of hydrofluoric acid needed for the dissolution step and reduces the fluoride ion concentration in the spent acid so that the spent acid can be easily treated in the sewage treatment plant and transforms the tantalum and niobium into easily soluble compounds such as their hydroxides.

In the following examples there are described several preferred embodiments to illustrate the invention. However, it is to be understood that the invention is not intended to be limited to the specific embodiments.

EXAMPLE 1

250 liters of spent acid from which tantalum and niobium had been extracted with ketone and having fluorine content of 100 g per liter in free hydrofluoric acid and dissolved fluorides were diluted with 200 liters of water and the mixture was then heated to 60°C. 100 kg of tin slag from Thailand containing 14.1% of $Ta_2O_5$ and 7.7% of $Nb_2O_5$ were added under stirring and after a reaction period of 5 hours, the insoluble residue was filtered off. The moist residue weighed 203 kg and the filtrate contained 0.1 g of tantalum per liter of filtrate. The residue was stirred with a mixture of 55 liters of 70% by weight of hydrofluoric acid and 40 liters of concentrated sulfuric acid to dissolve the tantalum and niobium in the residue. The resulting solution was subjected to counter current extraction with ketone to remove tantalum and niobium and the tantalum and niobium-free residual acid was recycled for additional slag treatment. The residual acid solution of 1.28 kg of the hydrofluoric acid-sulfuric acid decomposition contains only 0.2% by weight of $Ta_2O_5$ and 0.1% by weight of $Nb_2O_5$ and the amount of hydrofluoric acid and sulfuric acid used corresponded to the amount used by the prior art for decomposition of 40 to 50 kg of tantalite and/or columbite.

EXAMPLE 2

A mixture of 100 kg of Thai slag and 400 liters of silicofluoric acid (21% by weight of $H_2SiF_6$) and 200 liters of water was stirred for 4 hours at 90°C with heating with steam and the mixture was filtered. The 620 liters of filtrate contained 0.5 g/liter of $Nb_2O_5$ and 0.2 g/liter of $Ta_2O_5$ and the residue was dried to obtain 94.5 kg of solid which was a loss of 14.6%. The dried residue was reacted with 50 liters of 70% hydrofluoric acid and 40 liters of concentrated sulfuric acid and 200 liters of water were added thereto whereby 98% of the tantalum and niobium in the residue was dissolved. To dissolve the tantalum and niobium in 100 kg of the same Thai slag directly with hydrofluoric acid required 110 liters of hydrofluoric acid.

Various modifications of the method of the invention may be made without departing from the spirit or scope thereof and it should be understood that the invention is to be limited only as defined in the appended claims.

I claim:

1. In the method of obtaining tantalum and niobium from raw materials containing them by treating the materials with a hydrofluoric acid solution optionally containing sulfuric acid to dissolve the tantalum and niobium therein and extracting the resulting acid solution with a ketone to form a ketone solution of tantalum and niobium and a spent hydrofluoric acid, the improvement comprising first pretreating the tantalum-niobium containing material with spent hydrofluoric solution from the extraction step or a silicofluoric acid solution to convert acid soluble impurities to acid insoluble fluorides without substantially dissolving tantalum or niobium.

2. The method of claim 1 wherein the tantalumniobium containing materials are pretreated with spent hydrofluoric acid from the extraction step.

3. The method of claim 1 wherein the tantalumniobium containing materials are pretreated with a silicofluoric acid solution.

4. The method of claim 1 wherein the amount of acid solution used in pretreating is adjusted so that less than 5% of the tantalum and niobium will be dissolved.

* * * * *